US010282027B2

(12) United States Patent
Hattori

(10) Patent No.: US 10,282,027 B2
(45) Date of Patent: May 7, 2019

(54) INFORMATION PROCESSING APPARATUS

(71) Applicant: Fujitsu Client Computing Limited, Kanagawa (JP)

(72) Inventor: Masashi Hattori, Kawasaki (JP)

(73) Assignee: Fujitsu Client Computing Limited, Kanagawa (JP)

( * ) Notice: Subject to any disclaimer, the term of this patent is extended or adjusted under 35 U.S.C. 154(b) by 0 days.

(21) Appl. No.: 15/344,558

(22) Filed: Nov. 6, 2016

(65) Prior Publication Data

US 2017/0052644 A1 Feb. 23, 2017

Related U.S. Application Data

(63) Continuation of application No. PCT/JP2014/062247, filed on May 7, 2014.

(51) Int. Cl.
| | |
|---|---|
| G06F 3/041 | (2006.01) |
| G06F 1/08 | (2006.01) |
| G06F 1/26 | (2006.01) |
| G06F 3/044 | (2006.01) |
| G06F 1/324 | (2019.01) |
| G06F 1/3234 | (2019.01) |

(52) U.S. Cl.
CPC .............. *G06F 3/0418* (2013.01); *G06F 1/08* (2013.01); *G06F 1/263* (2013.01); *G06F 1/324* (2013.01); *G06F 1/3262* (2013.01); *G06F 3/044* (2013.01); *G06F 2203/04107* (2013.01); *Y02D 10/126* (2018.01)

(58) Field of Classification Search
CPC .......... G06F 3/0418; G06F 3/044; G06F 1/08; G06F 1/263; G06F 3/041
See application file for complete search history.

(56) References Cited

U.S. PATENT DOCUMENTS

| | | | | |
|---|---|---|---|---|
| 5,977,957 A | * | 11/1999 | Miller ...................... | G06F 1/32 178/18.01 |
| 2002/0108070 A1 | * | 8/2002 | Oh ........................ | G06F 1/3203 713/600 |
| 2004/0236969 A1 | * | 11/2004 | Lippert ..................... | G06F 1/30 713/300 |

(Continued)

FOREIGN PATENT DOCUMENTS

| | | |
|---|---|---|
| JP | 1986-172775 | 8/1986 |
| JP | 1993-241696 | 9/1993 |

(Continued)

OTHER PUBLICATIONS

International Search Report of PCT/JP2014/062247 dated Jul. 1, 2014.

(Continued)

*Primary Examiner* — Premal R Patel
(74) *Attorney, Agent, or Firm* — Osha Liang LLP

(57) ABSTRACT

An information processing apparatus includes a scan control unit, a detection unit, and a change unit. The scan control unit configured to scan a touch panel. The detection unit configured to detect a switchover of a power source of the information processing apparatus. The change unit configured to change a physical property of a drive signal input to the scan control unit when the detection unit detects the switchover of the power source.

4 Claims, 21 Drawing Sheets

(56) References Cited

U.S. PATENT DOCUMENTS

| | | | |
|---|---|---|---|
| 2008/0270767 A1* | 10/2008 | Sonobe | G06F 1/263 712/221 |
| 2011/0248937 A1 | 10/2011 | Suzuki | |
| 2012/0044195 A1 | 2/2012 | Nakanishi et al. | |
| 2012/0050229 A1* | 3/2012 | Tenuta | G06F 3/0418 345/178 |
| 2012/0262390 A1 | 10/2012 | Kida et al. | |
| 2013/0021267 A1* | 1/2013 | Lin | G06F 3/0416 345/173 |
| 2013/0215053 A1* | 8/2013 | Lin | G06F 3/041 345/173 |
| 2013/0222302 A1* | 8/2013 | Savard | G06F 3/0412 345/173 |
| 2013/0257756 A1* | 10/2013 | Chang | G06F 3/0418 345/173 |
| 2013/0335779 A1* | 12/2013 | Ito | G06K 15/1817 358/1.16 |
| 2014/0015791 A1* | 1/2014 | Huang | G06F 3/0418 345/174 |
| 2014/0253485 A1 | 9/2014 | Kida et al. | |
| 2015/0091868 A1 | 4/2015 | Nakanishi et al. | |
| 2015/0185956 A1 | 7/2015 | Takayama et al. | |
| 2015/0234519 A1* | 8/2015 | Gowreesunker | G06F 3/044 345/174 |
| 2016/0259467 A1* | 9/2016 | Nayyar | G06F 3/0416 |

FOREIGN PATENT DOCUMENTS

| | | |
|---|---|---|
| JP | 2000-267620 | 9/2000 |
| JP | 2001-527678 | 12/2001 |
| JP | 2011-086038 | 4/2011 |
| JP | 2012-042862 | 3/2012 |
| JP | 2012-221423 A | 11/2012 |
| JP | 2013-020526 | 1/2013 |
| JP | 2013025584 A * | 2/2013 |
| JP | 2013-097687 | 5/2013 |
| JP | 2014-041555 | 3/2014 |
| WO | 2014/030572 | 2/2014 |

OTHER PUBLICATIONS

Office Action of Japanese Patent Application No. 2016-517751 dated Oct. 24, 2017. Machine translation of the Office Action.
Office Action of Japanese Patent Application No. 2016-517751 dated Apr. 17, 2018. Machine translation of the Office Action.

* cited by examiner

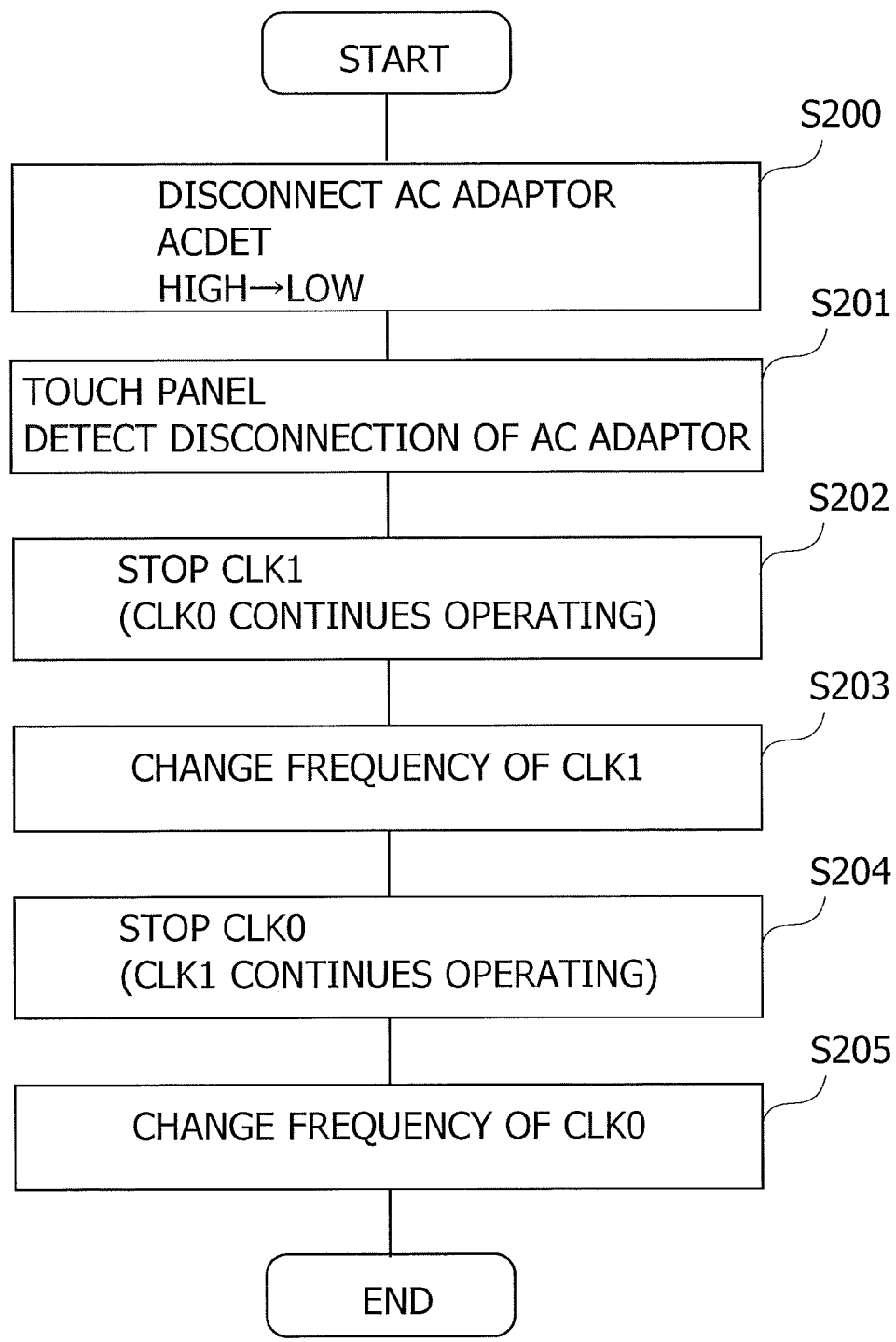

INFORMATION PROCESSING APPARATUS

CROSS-REFERENCE TO RELATED APPLICATION

This application is a continuation application of International Application PCT/JP2014/062247 filed on May 7, 2014 and designated the U.S., the entire contents of which are incorporated herein by reference.

FIELD

The embodiments discussed herein are related to an information processing apparatus.

BACKGROUND

An information processing apparatus equipped with a touch panel is utilized, the information processing apparatus being instanced by a tablet Personal Computer (PC) or a smartphone and other equivalent equipments. Such the information processing apparatus provides intuitive operations to a user by adopting the touch panel.

DOCUMENTS OF RELATED ARTS

Patent Document

[Patent document 1] Japanese National Publication of International Patent Application No. 2001-527678
[Patent document 2] Japanese Laid-open Patent Publication No. 2011-086038
[Patent document 3] Japanese Laid-open Patent Publication No. 2013-020526

SUMMARY

According to an aspect of the embodiments, an information processing apparatus includes a scan control unit, a detection unit, and a change unit. The scan control unit configured to scan a touch panel. The detection unit configured to detect a switchover of a power source of the information processing apparatus. The change unit configured to change a physical property of a drive signal input to the scan control unit when the detection unit detects the switchover of the power source.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF THE DRAWINGS

FIG. 8 is a flowchart illustrating a processing flow when the AC adaptor is disconnected from the information processing apparatus.

DESCRIPTION OF EMBODIMENTS

An information processing apparatus according to one embodiment will hereinafter be described with reference to the drawings. A configuration of the following embodiment is an exemplification, and the present apparatus is not limited to the configuration of the embodiment.

When an Alternating Current (AC) adaptor is connected to the information processing apparatus equipped with a touch panel, noises are generated from the AC adaptor. The touch panel is affected by the generated noises, resulting in a malfunction thereof as the case may be. Such being the case, one aspect of a technology of the disclosure reduces the malfunction of the touch panel due to the noises generated from a power source of the AC adaptor and other equivalent devices.

«Configuration of Notebook Computer Equipped with Touch Panel»

Figure 1:
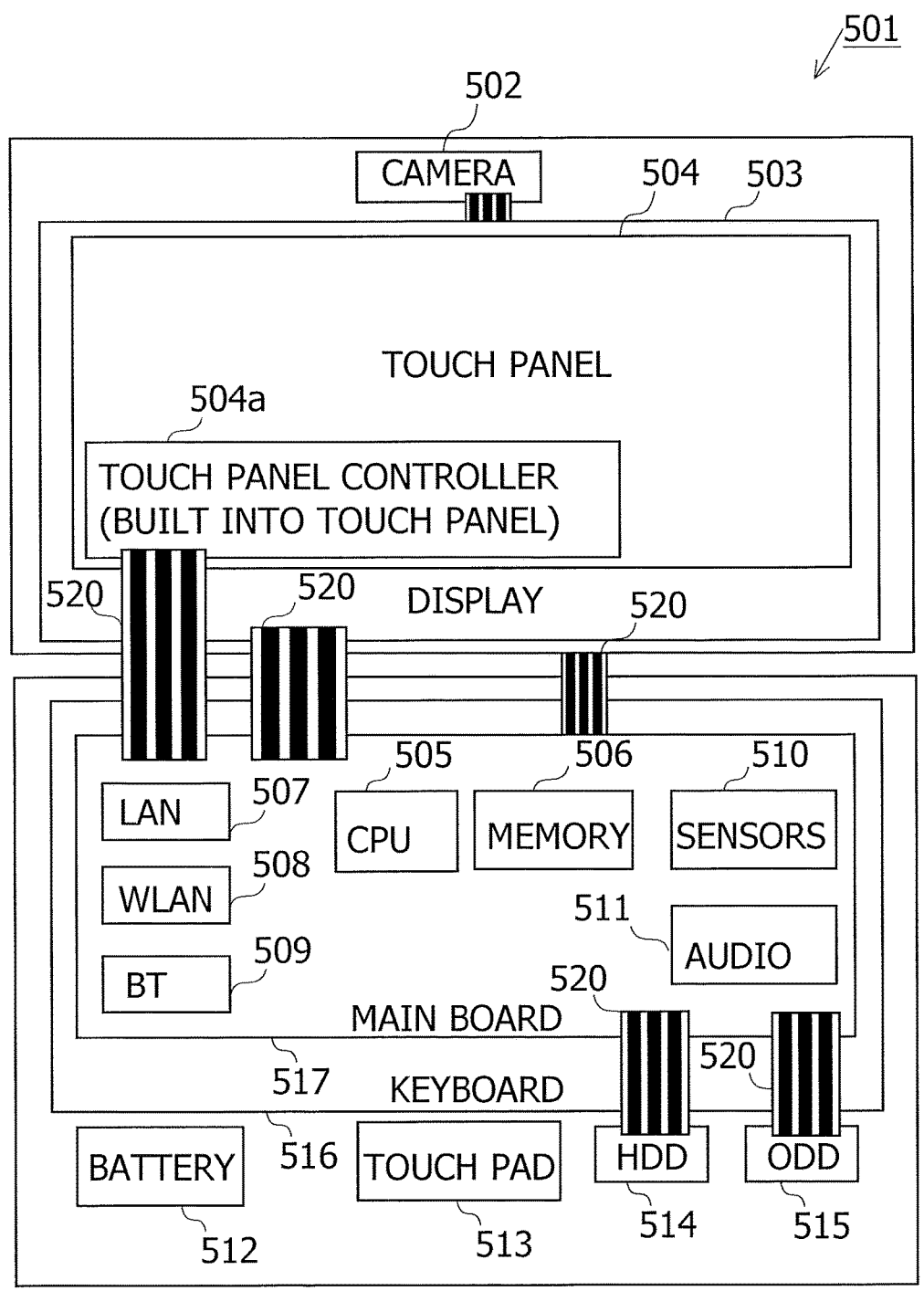
FIG. 1 is a diagram illustrating a configuration of a notebook computer equipped with a touch panel.

FIG. 1 is a diagram illustrating a configuration of a notebook computer 501 equipped with a touch panel 504. FIG. 1 depicts a camera 502, a display 503, the touch panel 504, a touch panel controller 504a, a CPU 505, a memory 506, a Local Area Network (LAN) 507, a Wireless LAN (WLAN) 508, Bluetooth (BT) 509, sensors 510, an audio 511, a battery 512, a touch pad 513, a Hard Disk Drive (HDD) 514, an Optical Disk Drive (ODD) 515, a keyboard 516, a main board 517, and a connector 520. A configuration of the notebook computer 501 will hereinafter be described with reference to FIG. 1.

The notebook computer 501 is an information processing apparatus. The CPU 505 deploys a program stored in the HDD 514 or the ODD 515 onto an operation area of the memory 506, and controls peripheral devices through running the program. The notebook computer 501 is thereby enabled to execute processes conforming to predetermined purposes.

The camera 502 is an image capturing device that captures static images or dynamic images (video). The display 503 is an output device. The display 503 is instanced by a Cathode Ray tube (CRT) display, a Liquid Crystal Display (LCD), a Plasma Display Panel (PDP) and an Electroluminescence (EL) panel or an organic EL panel.

The touch panel 504 is an input device that accepts a user's operation. The touch panel 504 accepts an input by a touch operation using a finger or a pen and other equivalent tools. The touch panel 504 is provided on a surface of the display 503.

The touch panel controller 504a is a control device configured to control the touch panel 504. The touch panel controller 504a is connected to the main board 517 via a connector 520. The touch panel controller 504a receives an input signal from, e.g., the touch panel 504. The touch panel controller 504a transmits the signal received from the touch panel 504 to the main board 517.

The main board 517 is a wiring board having wires for interconnecting the CPU 505 and other equivalent components. The main board 517 includes the CPU 505, the memory 506, the LAN 507, the WLAN 508, the BT 509, the sensors 510 and the audio 511.

The CPU 505 is an arithmetic processing unit. The CPU 505 deploys the program stored in the HDD 514 or the ODD 515 onto the operation area of the memory 506, and controls peripheral devices through running the program.

The memory 506 is exemplified as a storage unit to be accessed directly from the CPU 505. The memory 506 includes a Random Access Memory (RAM) and a Read Only Memory (ROM).

The LAN 507 is, e.g., an interface with the Local Area Network (LAN). The WLAN 508 is, e.g., an interface with the wireless LAN. The BT 509 is a Bluetooth-based communication module. The notebook computer 501 performs communications with external devices via the LAN 507, the WLAN 508 or the BT 509.

The sensors 510 are a variety of sensors. The sensors 510 are instanced by an acceleration sensor, a temperature sensor, an optical sensor and other equivalent sensors.

The audio 511 inputs and outputs sounds and voices. The battery 512 is a rechargeable battery. The battery 512 supplies electric power to the notebook computer 501. The touch pad 513 and the keyboard 516 are input devices. The touch pad 513 accepts the input by the touch operation. The keyboard 516 accepts an input by a key operation.

The HDD 514 is a Hard Disk Drive. The ODD 515 is an Optical Disk Drive. The HDD 514 and the ODD 515 serving as auxiliary storage units store various items of data.

COMPARATIVE EXAMPLE

Figure 2:
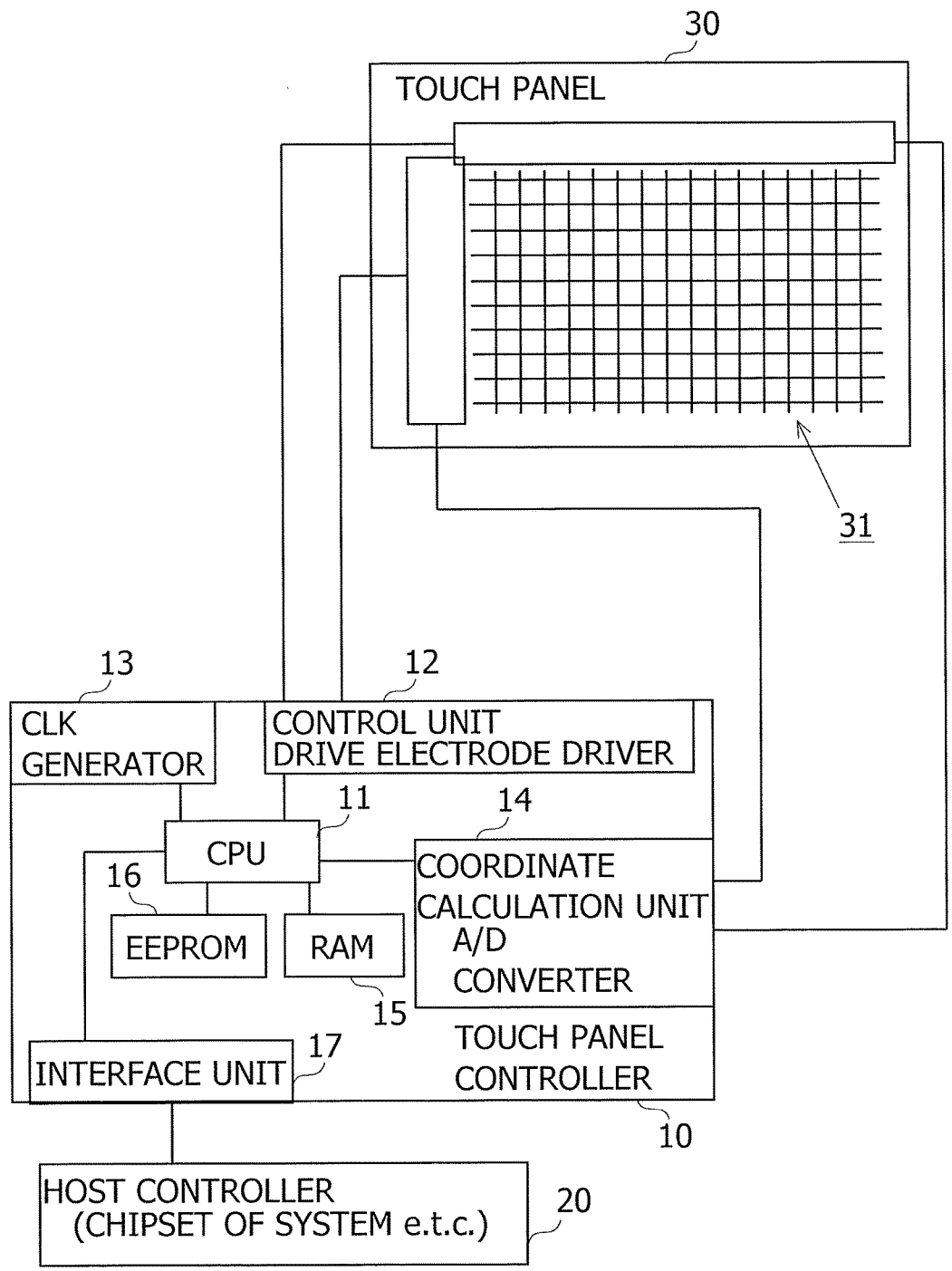
FIG. 2 is a diagram illustrating a configuration of a comparative example.

FIG. 2 is a diagram illustrating a configuration in a comparative example. FIG. 2 depicts a touch panel controller 10, a HOST controller 20 and a touch panel 30. The touch panel 30 in the comparative example is usable as the touch panel 504 of the notebook computer 501 illustrated in FIG. 1. The touch panel controller 10 is usable as the touch panel controller 504a in FIG. 1. The HOST controller 20 is usable as the main board 517 including the CPU 505 and other equivalent components. A description of the comparative example will hereinafter be made with reference to FIGS. 2 and 3.

The touch panel controller 10 accepts the input signal from the touch panel 30. The touch panel controller 10 transmits the input signal accepted from the touch panel 30 to the HOST controller 20.

The touch panel controller 10 includes a Central Processing Unit (CPU) 11, a control unit 12, a clock (CLK) generator 13, a coordinate calculation unit 14, a Random Access Memory (RAM) 15, an Electrically Erasable Programmable Read-Only Memory (EEPROM) 16, and an interface unit 17.

The CPU 11 is an arithmetic processing unit. The control unit 12 has a drive electrode driver, and inputs the electric power for actuating scan lines 31 of the touch panel 30. The CLK generator 13 inputs a clock signal to the CPU 11. The coordinate calculation unit 14 accepts the input signal from the touch panel 30. The RAM 15 is a volatile memory. The RAM 15 provides an operation area to the CPU 11. The EEPROM 16 is a nonvolatile memory. The EEPROM 16 stores setting information and other equivalent information. The interface unit 17 inputs and outputs the data to and from the HOST controller 20.

The HOST controller 20 accepts the input signal from the touch panel controller 10. The HOST controller 20 calculates, based on the input signal, a coordinate of a position input to the touch panel 30.

The touch panel 30 accepts a user's input. The touch panel 30 includes the scan lines 31. The scan lines 31 are provided in array on the surface of the touch panel 30. The scan lines 31 detect an input of a user's touch.

Figure 3:
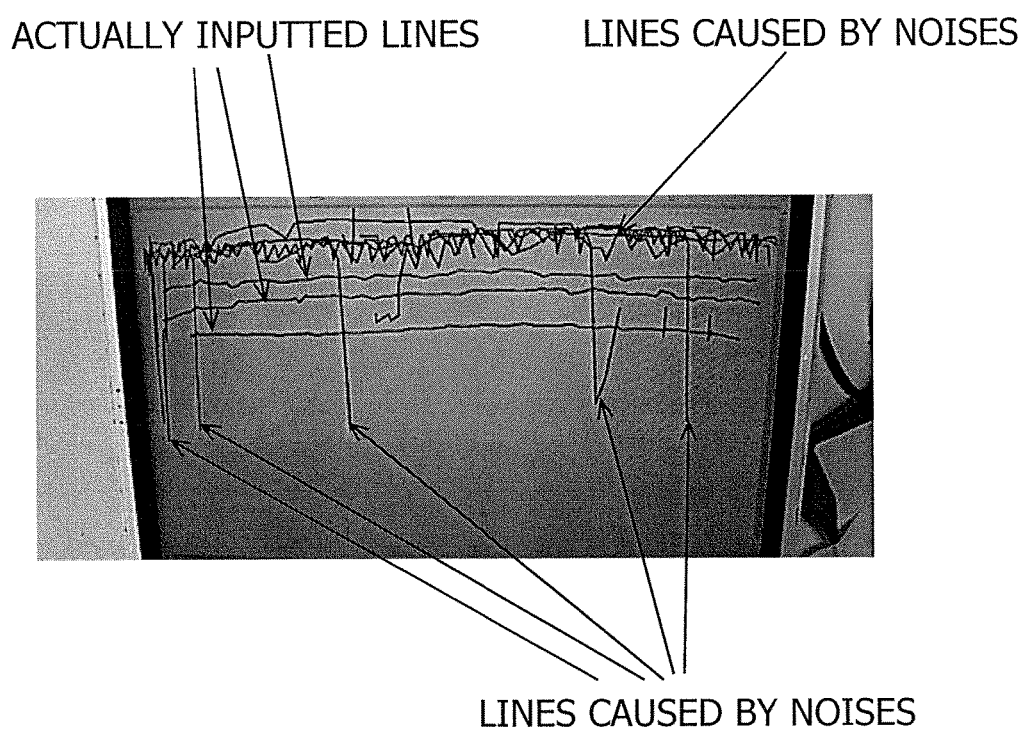
FIG. 3 is a diagram illustrating a screen of the touch panel in the comparative example, in which an AC adaptor is connected.

FIG. 3 is a diagram illustrating a touch panel screen in the comparative example, in which an Alternative Current (AC) adaptor is connected. When three lines are input in a crosswise direction of FIG. 3, lines extending in a lengthwise direction are produced due to being affected by noises from the AC adaptor. Patterns are also formed due to being affected by the noises at a portion above the three lines to be actually drawn.

The touch panel 30 in the comparative example does not change a frequency of the clock signal input to the CPU 11, also when the AC adaptor is connected. Therefore, when receiving the noises of the same frequency as the frequency of the clock signal input to the CPU 11 from the AC adaptor, the CPU 11 may malfunction because of being affected by the noises. A sampling rate for detecting the user's operation by the scan lines 31 is n-fold or 1/n-fold (n is an integer) of the clock input to the CPU 11. Consequently, when receiving the noises of the frequency that is n-fold or 1/n-fold of the operating frequency of the CPU 11, the touch panel 30 malfunctions as the case may be.

《Embodiment》

Figure 4:
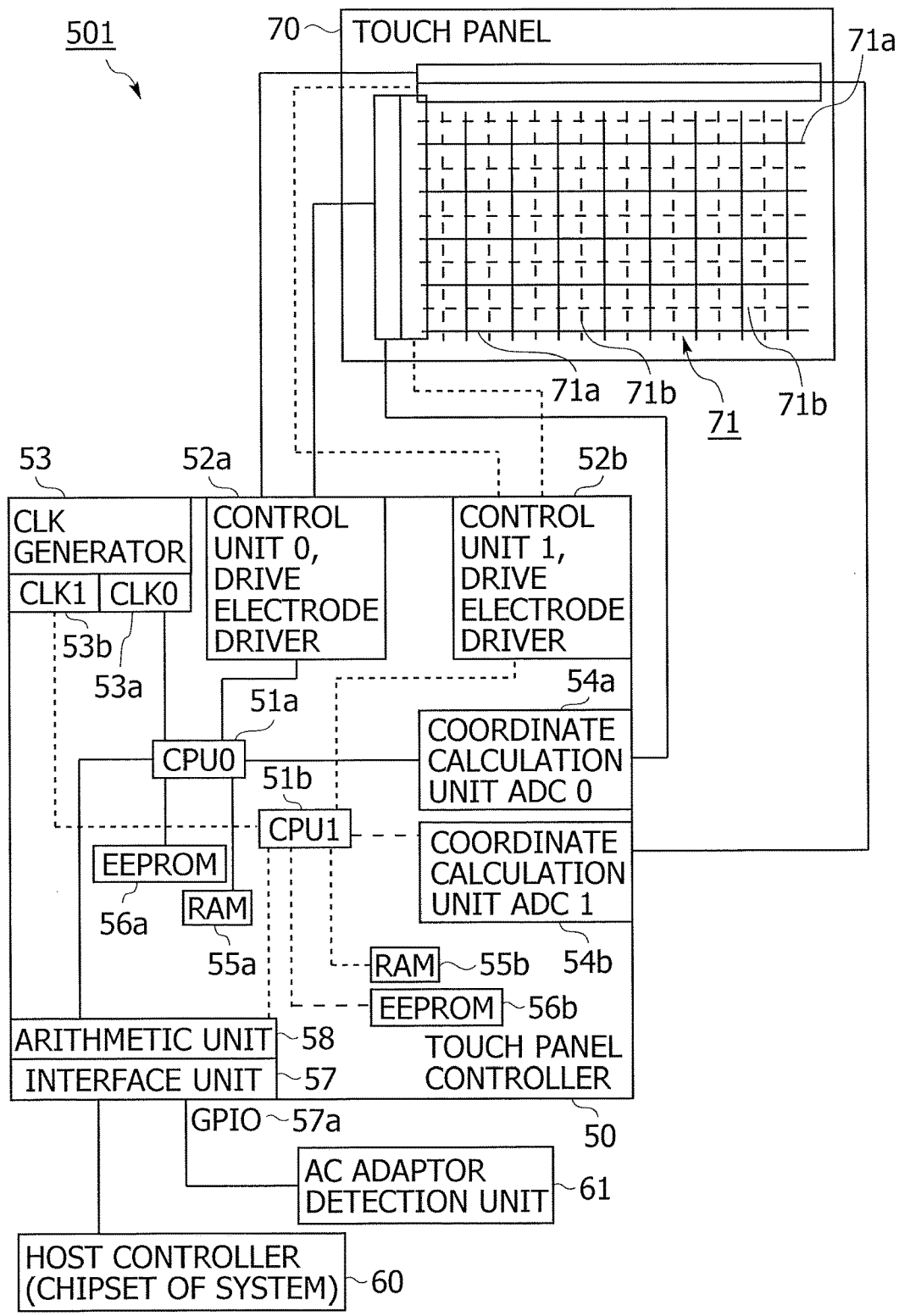
FIG. 4 is a diagram illustrating a configuration of an information processing apparatus according to an embodiment.

FIG. 4 is a diagram illustrating a configuration of an embodiment. The embodiment is exemplified by the notebook computer 501 including a touch panel 70. The embodiment is not, however, limited to the notebook computer 501. The embodiment may also be exemplified by a smartphone, a tablet PC, a desktop PC or a server. The embodiment includes a touch panel controller 50, a HOST controller 60, an AC adaptor detection unit 61, and the touch panel 70. In the embodiment, when the AC adaptor is connected to the notebook computer 501, the frequencies of the clock signals input to a CPU0 51a and a CPU1 51b each controlling the touch panel 70 are changed. As a result, the malfunction of the touch panel 70 due to being affected by the noises from the AC adaptor is reduced. The embodiment will hereinafter be described with reference to FIGS. 4 through 9.

The touch panel controller 50 is usable as the touch panel controller 504a in FIG. 1. The HOST controller 60 is usable as the main board 517 including the CPU 505 and other equivalent components in FIG. 1. The touch panel 70 is usable as the touch panel 504 in FIG. 1. The notebook computer 501 in the embodiment will hereinafter be described with reference to FIG. 4.

The touch panel controller 50 includes the CPU0 51a, the CPU1 51b, a control unit 0 52a, a control unit 1 52b, a CLK generator 53, a coordinate calculation unit ADC0 54a, a coordinate calculation unit ADC1 54b, a RAM 55a, a RAM 55b, an EEPROM 56a, an EEPROM 56b, an interface unit 57, and an arithmetic unit 58.

The CPU0 51a and the CPU1 51b are arithmetic processing units. Connected to the CPU0 51a are the control unit 0 52a, the CLK generator 53, the coordinate calculation unit ADC0 54a, the RAM 55a, the EEPROM 56a, the interface unit 57, and the arithmetic unit 58. Connected to the CPU1 51b are the control unit 1 52b, the CLK generator 53, the coordinate calculation unit ADC1 54b, the RAM 55b, the EEPROM 56b, the interface unit 57, and the arithmetic unit 58. In the present specification, the CPU0 51a and the CPU1 51b in combination are generically termed the CPU 51. The CPU 51 is one example of a "scan control unit". The CPU0 51a is one example of a "first scan control unit". The CPU1 51b is one example of a "second scan control unit".

The control unit 0 52a and the control unit 1 52b have drive electrode drivers, thereby inputting the electric power to scan lines 71 of the touch panel 70 in order to actuate the scan lines 71. The control unit 0 52a and the control unit 1 52b input the electric power to the scan lines different from each other. The control unit 0 52a inputs the electric power to, e.g., odd-numbered scan lines 71a (indicated by solid straight lines in FIG. 4). The control unit 1 52b inputs the electric power to, e.g., even-numbered scan lines 71b (indicated by dotted lines in FIG. 4).

The CLK generator 53 inputs the clock signals to the CPU0 51a and the CPU1 51b. A CLK0 53a of the CLK generator 53 is connected to the CPU0 51a. A CLK1 53b of the CLK generator 53 is connected to the CPU1 51b. The CLK generator 53 is enabled to input the clock signals having the frequencies different from each other to the CPU0 51a and the CPU1 51b. Alternatively, the CLK generator 53 may also input the clock signals having the same frequency to the CPU0 51a and the CPU1 51b. The frequency of the clock signal is one example of a "physical property of a drive signal". The CLK generator 53 is one example of a "change unit".

The coordinate calculation unit ADC0 54a and the coordinate calculation unit ADC1 54b accept the signals from the touch panel 70. The accepted signals are transmitted to the arithmetic unit 58 via the CPU 51. The arithmetic unit 58 calculates a coordinate of a position which is input to the touch panel 70.

The RAM 55a and the RAM 55b are the volatile memories. The RAM 55a provides the operation area to the CPU0 51a. The RAM 55b provides the operation area to the CPU1 51b.

The EEPROM 56a and the EEPROM 56b are the non-volatile memories. The EEPROM 56a and the EEPROM 56b store the setting information and other equivalent items of information.

The interface unit 57 inputs and the outputs the data between the touch panel controller 50 and the HOST controller 60. The interface unit 57 includes a General Purpose Input/Output (GPIO) 57a. The touch panel controller 50 receives notification, indicating whether the AC adaptor is connected, from the AC adaptor detection unit 61 connected to the GPIO 57a.

The arithmetic unit 58 receives the data from the coordinate calculation unit ADC0 54a via the CPU0 51a. The arithmetic unit 58 receives the data from the coordinate calculation unit ADC1 54b via the CPU1 51b. The arithmetic unit 58 calculates, based on the received data, coordinates on the touch panel. Arithmetic results are transmitted to the HOST controller 60 via the interface unit 57. The arithmetic unit 58 is one example of an "arithmetic unit".

The HOST controller 60 accepts a calculation result of the coordinate by the arithmetic unit 58 from the touch panel controller 50.

The AC adaptor detection unit 61 detects a connection of the AC adaptor to the notebook computer 501. The AC adaptor detection unit 61 is one example of a "detection unit".

The touch panel 70 accepts the user's input. The touch panel 70 is instanced by a capacitance type touch panel. The touch panel 70 is equipped with the scan lines 71. The scan lines 71 are provided in array on the surface of the touch panel 70. The scan lines 71 detect an input of a user's touch. The scan lines 71 include the scan lines 71a actuated by the control unit 0 52a, and the scan lines 71b actuated by the control unit 1 52b. Of the scan lines 71 in FIG. 4, the scan lines 71a are odd-numbered scan lines, while the scan lines 71b are even-numbered scan lines. The scan lines 71a and the scan lines 71b are not, however, limited to such a layout. Of the scan lines 71, e.g., the scan lines 71a may be the scan lines in the lengthwise direction, while the scan lines 71b may also be the scan lines in the crosswise direction. Of the scan lines 71, e.g., the scan lines 71a may further be the scan lines on a right half surface of the touch panel 70, while the scan lines 71b may also be the scan lines on a left half surface of the touch panel 70. The touch panel 70, upon detecting the input by the scan lines 71, transmits a signal indicating an input position to the coordinate calculation unit ADC0 54a and the coordinate calculation unit ADC1 54b.

<Affection by Noises>

Figure 5:
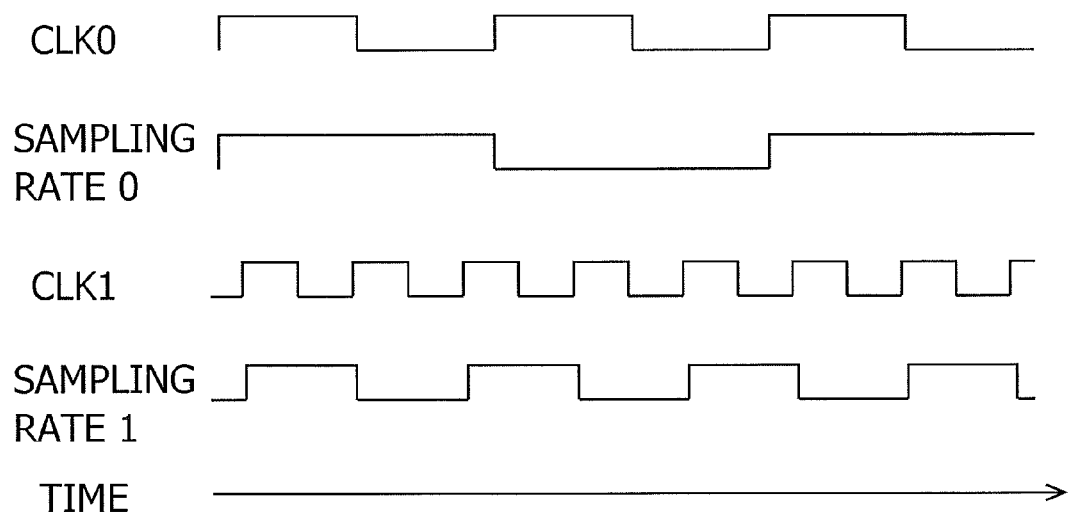
FIG. 5 is a diagram illustrating waveforms of clock signals input to a CPU and of sampling rates of the touch panel.

FIG. 5 is a diagram illustrating waveforms of the clock signals input to the CPU 51 and of sampling rates of the touch panel 70. A symbol CLK0 in FIG. 5 indicates a waveform of the clock signal input to the CPU0 51a by the CLK0 53a. A sampling rate 0 indicates a waveform of the sampling rate of the scan lines 71a, controlled by the CPU0 51a, on the touch panel 70. A symbol CLK1 in FIG. 5 indicates a waveform of the clock signal input to the CPU1 51b by the CLK1 53b. A sampling rate 1 indicates a waveform of the sampling rate of the scan lines 71b, controlled by the CPU1 51b, on the touch panel 70. A symbol TIME indicates an advancement of time toward right from left in FIG. 5.

In FIG. 5, the CLK0 and the CLK1 are of frequencies different from each other. Further in FIG. 5, the CLK0 and the CLK1 are respectively out of phase. Still further in FIG. 5, the sampling rates 0 and 1 are ½-fold of the frequencies of the CLK0 and the CLK1.

Figure 6:
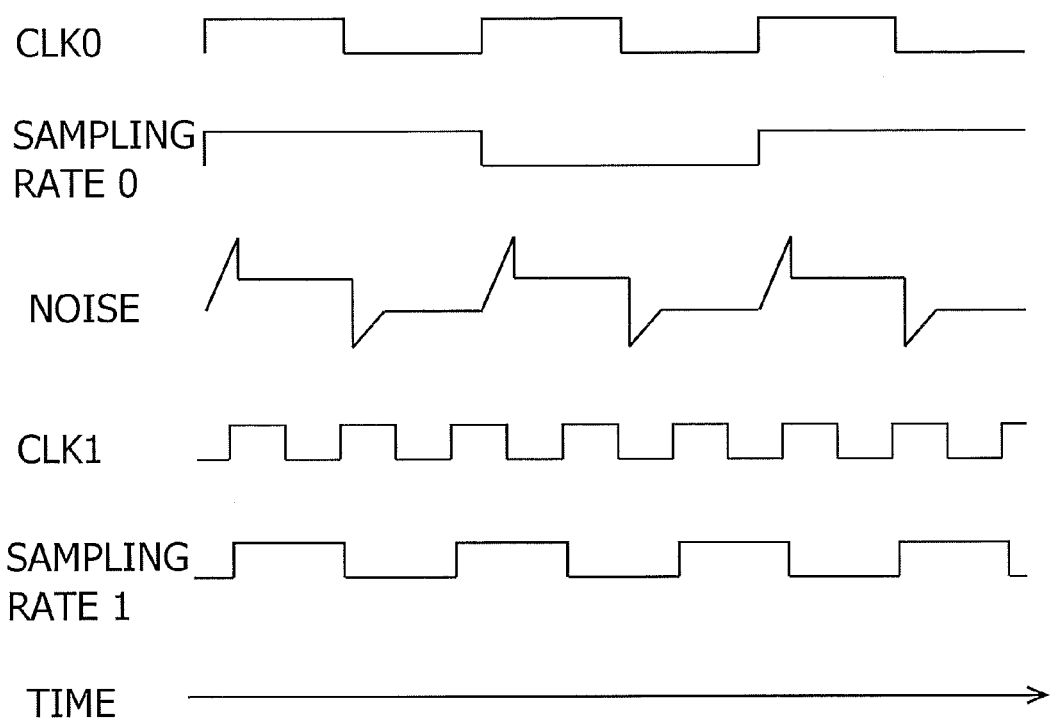
FIG. 6 is a diagram illustrating the waveforms of the clock signals input to the CPU and of the sampling rates of the touch panel.

FIG. 6 is a diagram illustrating waveforms of the clock signals input to the CPU 51 and of sampling rates of the touch panel 70. FIG. 6 illustrates a state of applying noises to a state of the embodiment in operation at the frequencies depicted in FIG. 5. The AC adaptor connected to the notebook computer 501 causes these noises.

A frequency of the noises illustrated in FIG. 6 is the same as the frequency of the CLK0. The CPU0 51a actuated by the CLK0 is therefore affected by the noises and malfunctions as the case may be. Note that the sampling rate 0 is n-fold or 1/n-fold (n is the natural number) of the CLK0. Hence, there are caused the noises having the frequency that is n-fold or 1/n-fold of the CLK0, in which case the touch panel 70 might be affected by the noises. However, the CPU1 51b is actuated by the CLK1 that is different in frequency and phase from the noises. The CPU1 51b is thereby enabled to continue operating without being affected by the noises.

In other words, as far as the frequency of the clock input to the CPU 51 is different from the frequency of the noises caused by the AC adaptor, it is feasible to reduce a degree of how much the CPU 51 is affected by the noises. Such being the case, with reference to FIGS. 7A-9, the discussion will hereinafter deal with a technology of reducing the degree of being affected by the noises caused from the AC adaptor in the embodiment.

Figure 7A:
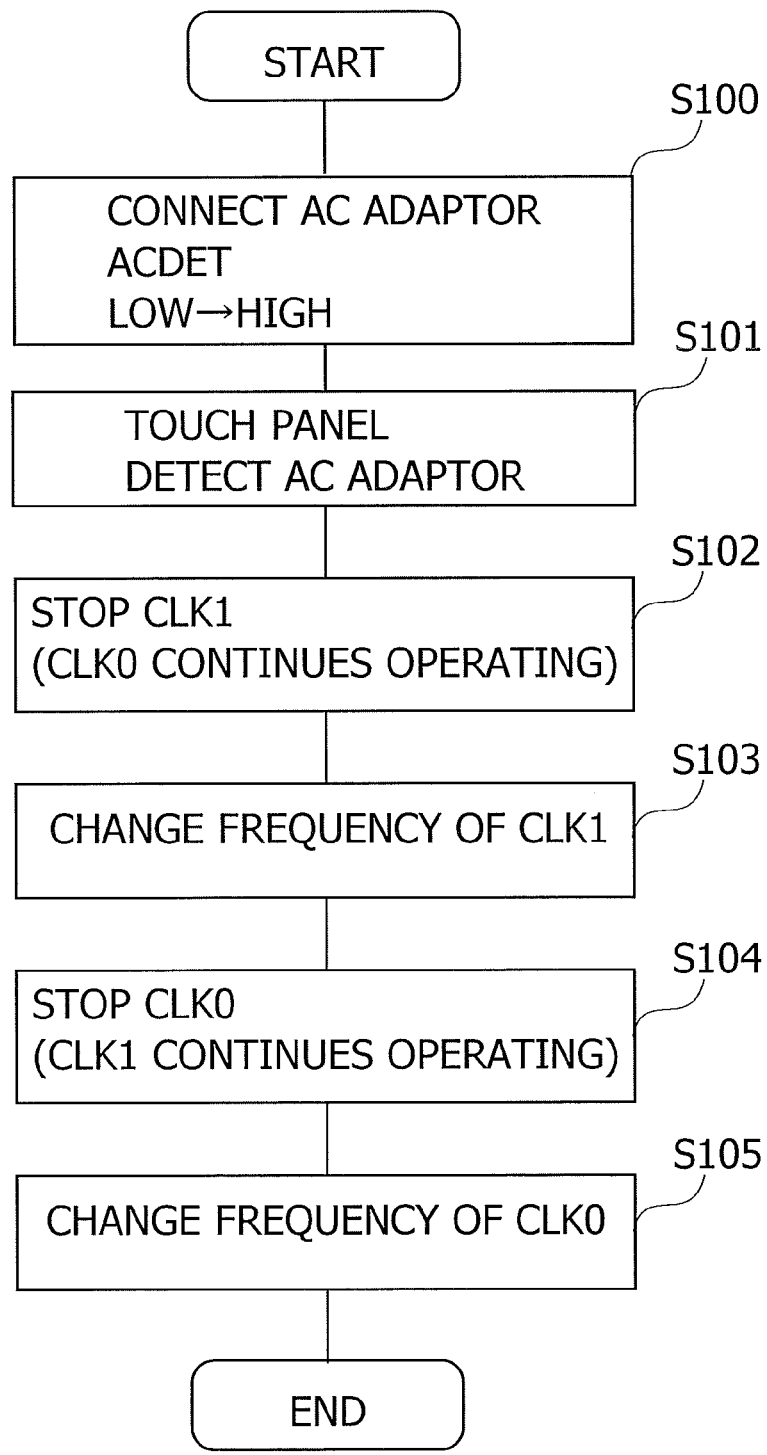
FIG. 7A is a flowchart illustrating a processing flow when the AC adaptor is connected to the information processing apparatus.

FIG. 7A is a flowchart illustrating a processing flow when the AC adaptor is connected to the notebook computer 501. FIGS. 7B-7H are diagrams each illustrating the touch panel controller 50 and the touch panel 70 in respective steps of FIG. 7A. The following description will be made by exemplifying the scan lines extending in the lengthwise direction for convenience of explanation. The processing flow, with the AC adaptor being connected to the notebook computer 501, will hereinafter be described with reference to FIGS. 7A-7H.

Figure 7B:
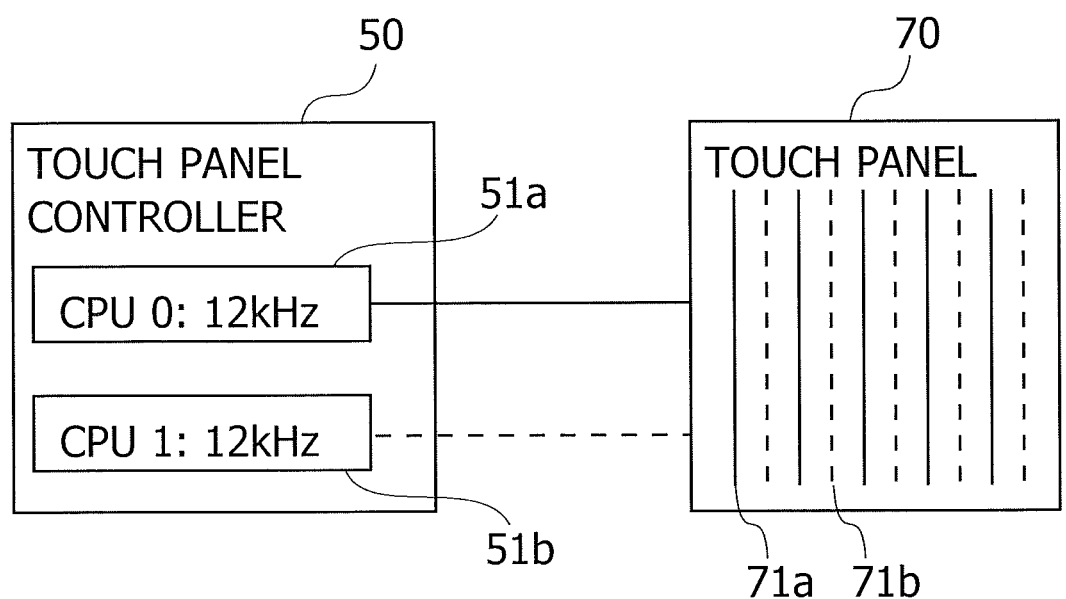
FIG. 7B is a diagram illustrating a state of not connecting the AC adaptor.

The flowchart in FIG. 7A starts from a state of the AC adaptor not yet being connected. In this state, e.g., as illustrated in FIG. 7B, the frequency of the clock signal input to the CPU0 51a is the same as the frequency (which are each 12 kHz in FIG. 7B) of the clock signal input to the CPU1 51b. FIG. 7B is a diagram illustrating a state of the AC adaptor not yet being connected to the notebook computer 501. A process of changing the frequency of the clock signal input to the CPU1 51b will hereinafter be described with reference to S100-S103 in FIG. 7A and with reference to FIGS. 7B-7F as well.

In S100, the AC adaptor is connected to the notebook computer 501. The notebook computer 501 detects the connection of the AC adaptor (S100).

In S101, the detection of the AC adaptor is transferred to the touch panel controller 50. A method of transferring the connection of the AC adaptor to the touch panel controller 50 may be attained simply by transmitting a detection signal of the connection of the AC adaptor to the touch panel controller 50. Alternatively, the connection of the AC adaptor may also be detected by making use of Application Programming Interface (API) provided by the OS (S101).

Figure 7C:
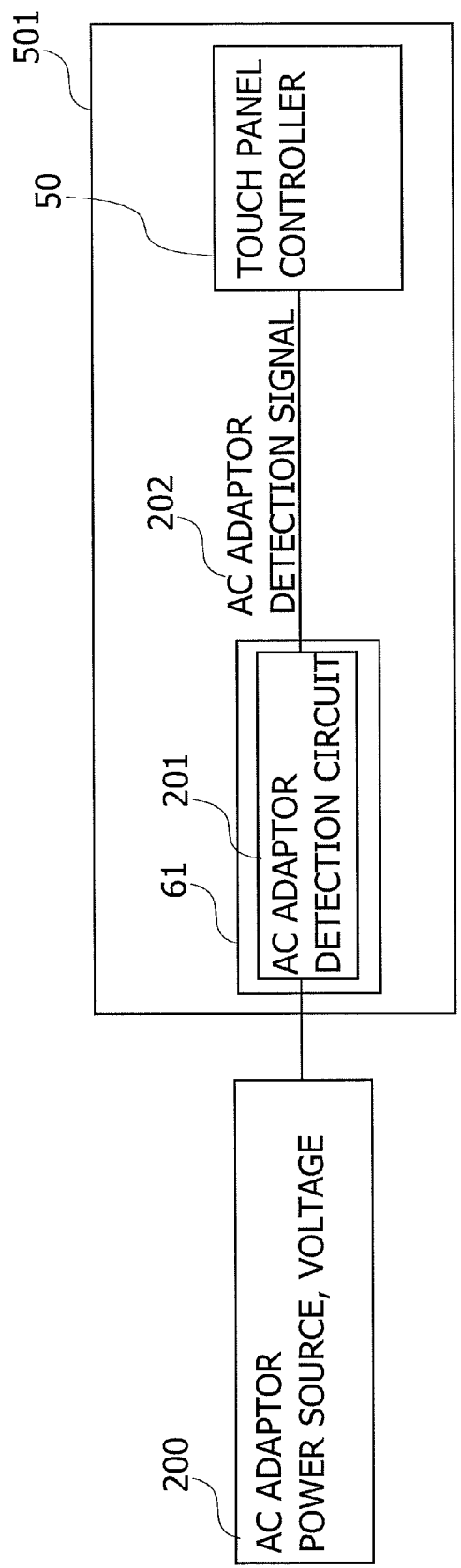
FIG. 7C is a processing block diagram of a system for detecting a connection of the AC adaptor by a hardware circuit.
Figure 7D:
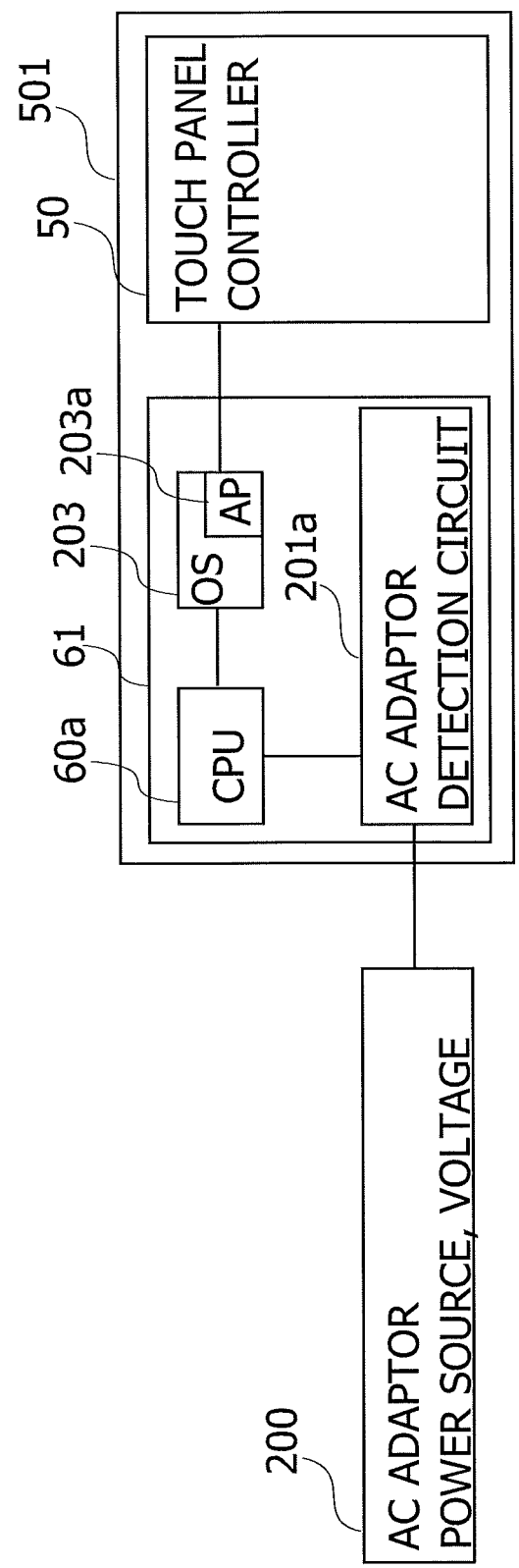
FIG. 7D is a processing block diagram of the system for detecting the connection of the AC adaptor by making use of an API provided by an OS.

FIGS. 7C and 7D are processing block diagrams of systems for transfering the connection of an AC adaptor 200 to the touch panel controller 50. The process in S101 of FIG. 7A will hereinafter be described with reference to FIGS. 7C and 7D.

(Hardware Based Detection of AC Adaptor 200)

FIG. 7C is the processing block diagram of the system for detecting the connection of the AC adaptor 200 by a hardware circuit. FIG. 7C depicts the respective processing blocks of the AC adaptor 200, an AC adaptor detection circuit 201 and the touch panel controller 50.

The AC adaptor 200 is an adaptor that connects a power source to the notebook computer 501. The power source is instanced by a plug socket for the household power source. The AC adaptor detection circuit 201 detects that the AC adaptor 200 is connected to the notebook computer 501. The AC adaptor detection circuit 201 is used as the AC adaptor detection unit 61 in FIG. 4. The AC adaptor detection circuit 201 having detected the connection of the AC adaptor 200 transmits an AC adaptor detection signal 202 to the touch panel controller 50.

The AC adaptor detection circuit 201 detects the connection of the AC adaptor 200. The AC adaptor detection circuit 201 transmits, to the touch panel controller 50, the AC adaptor detection signal 202 for notifying of the connection of the AC adaptor 200. It may be sufficient that the AC adaptor detection signal 202 is input to the GPIO 57a of the touch panel controller 50.

The hardware based method, unlike an undermentioned API-based method of detecting the AC adaptor 200, might not involve installing the application for detecting the AC adaptor 200. It is therefore feasible to detect the connection of the AC adaptor 200 even when the application is deleted or does not respond. The detection of the AC adaptor 200 may involve simply adding a circuit for transmitting the AC adaptor detection signal 202 to the interface unit 57 of the touch panel controller 50 from the AC adaptor detection circuit 201.

(API-Based Detection of AC Adaptor 200)

FIG. 7D is the processing block diagram of the system for detecting the connection of the AC adaptor 200 by utilizing the API provided by an OS 203. FIG. 7D depicts respective processing blocks of the AC adaptor 200, an AC adaptor detection circuit 201a, a CPU 60a, the OS 203 and the touch panel controller 50. The OS 203 is preinstalled with an AP 203a as an application for detecting the connection of the AC adaptor 200. For example, the CPU 505 in FIG. 1 as the respective blocks runs a computer program deployed in the executable manner on the memory 506. However, at least part of any one block in FIG. 7D may include a hardware circuit.

The AC adaptor detection circuit 201a detects the connection of the AC adaptor 200. The AC adaptor detection circuit 201a notifies the CPU 60a of the connection of the AC adaptor 200.

The CPU 60a is a processor provided in the HOST controller 60. The AC adaptor detection circuit 201a notifies the CPU 60a of the connection of the AC adaptor 200.

The OS 203 is an Operating System (OS) preinstalled in the notebook computer 501. The AP 203a is an application preinstalled in the OS 203. The AP 203a detects the connection of the AC adaptor 200 via the API of the OS 203 from the CPU 60a. The AP 203a notifies the touch panel controller 50 of the detection of the AC adaptor 200. The AP 203a may detect the connection of the AC adaptor 200 to the touch panel controller 50 by using an existing circuit (e.g., the connector 520 in FIG. 1). The AC adaptor detection circuit 201a, the CPU 60a and the OS 203 are utilized as the AC adaptor detection unit 61 in FIG. 4.

A method of using the API of the OS might not involve adding the circuit for transmitting the AC adaptor detection signal 202 to the touch panel controller 50 from the AC adaptor detection circuit 201. The detection of the connection of the AC adaptor 200 may involve simply installing, into the notebook computer 501, an application for acquiring connection information of the AC adaptor 200 from the API of the OS.

Next, the processing advances to S102 in FIG. 7A. In S102 of FIG. 7A, the CPU0 51a instructs the clock generator 53 to stop inputting the clock signal by the CLK1 53b. As a result, the CPU1 51b is stopped. The CPU1 51b saves, as a process for when being stopped, information for designating a mode for when being started next time in, e.g., the EEPROM 56b. For example, a bit indicating that the CPU1 51b executes the process of stopping the CLK0 53a, may be simply set ON. Note that the CLK0 53a continues inputting the clock signal to the CPU0 51a. Consequently, the CPU0 51a continues operating. Accordingly, even in a state of the CPU1 51b being stopped, it is feasible to detect the user's input to the touch panel 70 through the scan lines 71a (S102).

Figure 7E:
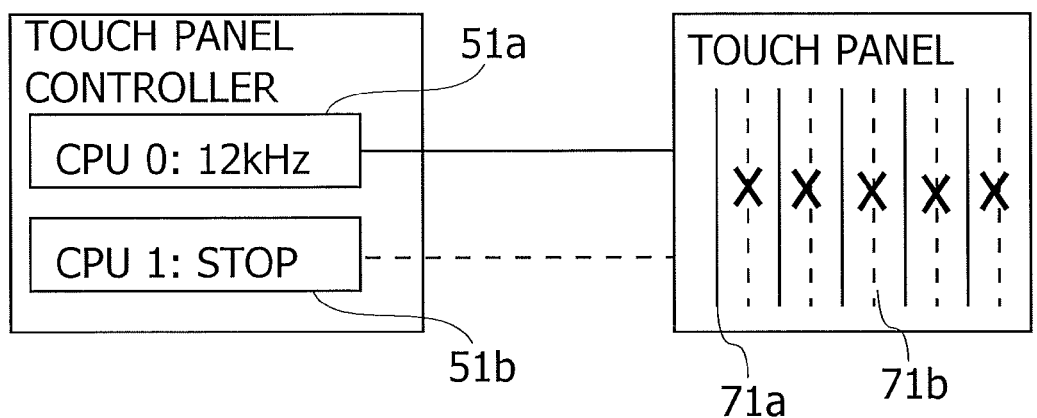
FIG. 7E is a diagram illustrating a state of stopping an operation of a CPU1.

FIG. 7E is the diagram illustrating the state in S102 of FIG. 7A. FIG. 7E depicts the state in which the CPU1 51b stops operating. In FIG. 7E, the CPU1 51b stops operating. The scan lines 71b controlled by the CPU1 51b do not therefore detect the touch operation on the touch panel 70. However, the CPU0 51a continues operating. The scan lines 71a controlled by the CPU0 51a therefore detect the touch operation on the touch panel 70.

Subsequently, in S103 of FIG. 7A, the frequency of the clock signal input from the CLK1 53b is changed, and the CPU1 51b is started up (S103).

Figure 7F:
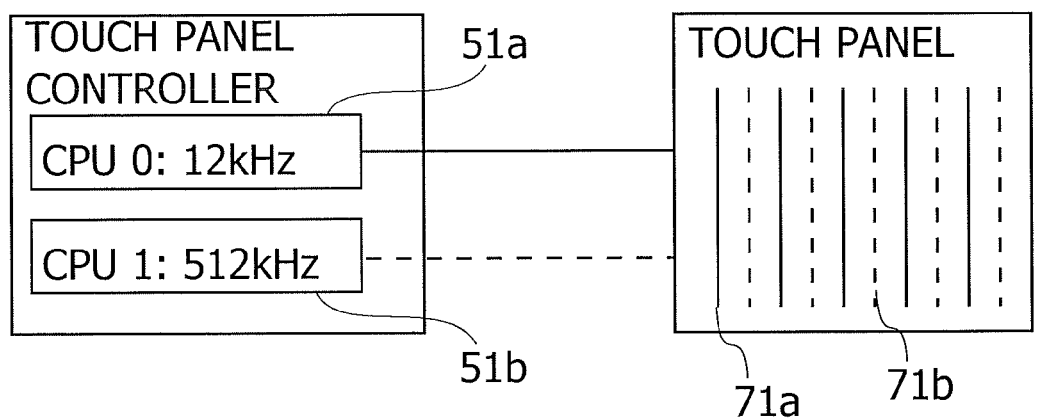
FIG. 7F is a diagram illustrating a state after changing a frequency of the clock signal input to the CPU1.

FIG. 7F is the diagram illustrating the state in S103 of FIG. 7A. FIG. 7F is the diagram illustrating a state after changing the frequency of the clock signal input to the CPU1 51b. In FIG. 7F, the clock signal input to the CPU0 51a has a frequency of 12 kHz. The clock signal input to the CPU1 51b has a frequency of 512 kHz as a post-changing frequency.

In S104 of FIG. 7A, upon being started up, the CPU1 51b reads the information saved in the EEPROM 56b in S102. The CPU1 51b reads this information, thereby recognizing that the process of stopping the CLK0 53a is to be executed. The CPU1 51b instructs the clock generator 53 to stop inputting the clock signal by the CLK0 53a. As a result, the CPU0 51a is stopped. Note that the CLK1 53b continues inputting the clock signal. The CPU1 51b therefore continues operating. Accordingly, the scan lines 71b can detect the user's input to the touch panel 70 even in the state of the CPU0 51a being stopped (S104).

Figure 7G:
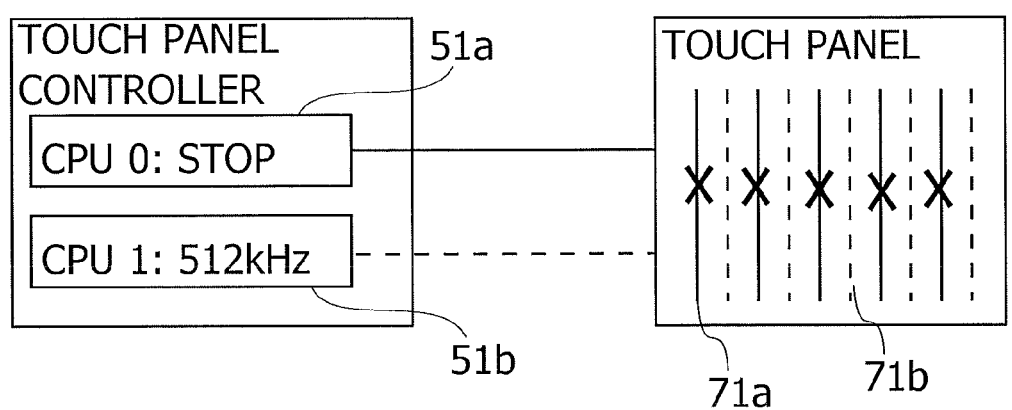
FIG. 7G is a diagram illustrating a state of stopping an operation of a CPU0.

FIG. 7G is the diagram illustrating the state in S104 of FIG. 7A. FIG. 7G is the diagram illustrating the state of stopping the operation of the CPU0 51a. In FIG. 7G, the CPU0 51a stops operating. The scan lines 71a controlled by the CPU0 51a do not therefore detect the touch operation on the touch panel 70. However, the CPU1 51b continues operating. Hence, the scan lines 71b controlled by the CPU1 51b can detect the touch operation on the touch panel 70.

Subsequently, in S105 of FIG. 7A, the frequency of the clock signal input from the CLK0 53a is changed, and the CPU1 51a is started up. The processes in S102 through S105 are one example of a process of "alternately changes the physical properties of the drive signals input to the first scan control unit and the second scan control unit" (S105).

Figure 7H:
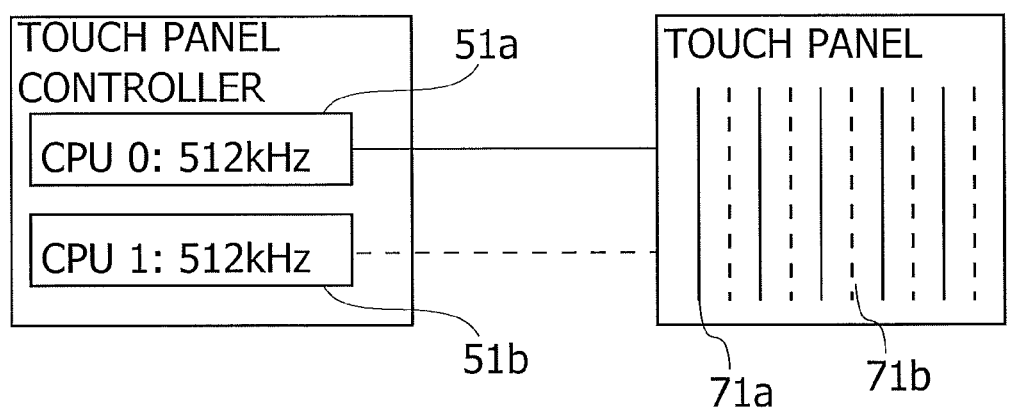
FIG. 7H is a diagram illustrating a state after changing the frequency of the clock signal input to the CPU0.

FIG. 7H is the diagram illustrating the state in S105 of FIG. 7A. FIG. 7H is the diagram depicting the state after changing the frequency of the clock signal of the CPU0 51a. In FIG. 7H, the frequencies of the clock signals input to the CPU0 51a and the CPU1 51b are each 512 kHz.

In FIGS. 7A-7G given above, for the convenience of explanation, there has been described the process of changing the frequency of the clock signal input to the CPU 51 by using the scan lines in the lengthwise direction. The same process is, however, executed with respect to the scan lines in the crosswise direction.

The operating frequency of the AC adaptor varies correspondingly to a load on the notebook computer 501, and hence the frequency of the noises caused from the AC adaptor also varies. Such being the case, a sampling survey about the noises generated from the AC adaptor was carried out, and the frequency of the noises from the AC adaptor was within a range of 54.64 kHz-119.05 kHz. It is therefore considered that the degree of the CPU 51 being affected by the noises is reduced by setting the frequency of the clock signal input to the CPU 51 at approximately several hundreds of kHz through several hundreds of MHz.

FIG. 8 is a flowchart illustrating a processing flow when the AC adaptor 200 is disconnected from the notebook computer 501. Processes in FIG. 8 are substantially the same as the processes in FIG. 7A except that a disconnection of the AC adaptor 200 is detected in S200 and S201 and that the frequency of the clock signal is decreased (e.g., to 12 kHz from 512 kHz) in S203 and S205. The redundant explanations of the same processes are therefore omitted.

Figure 9:
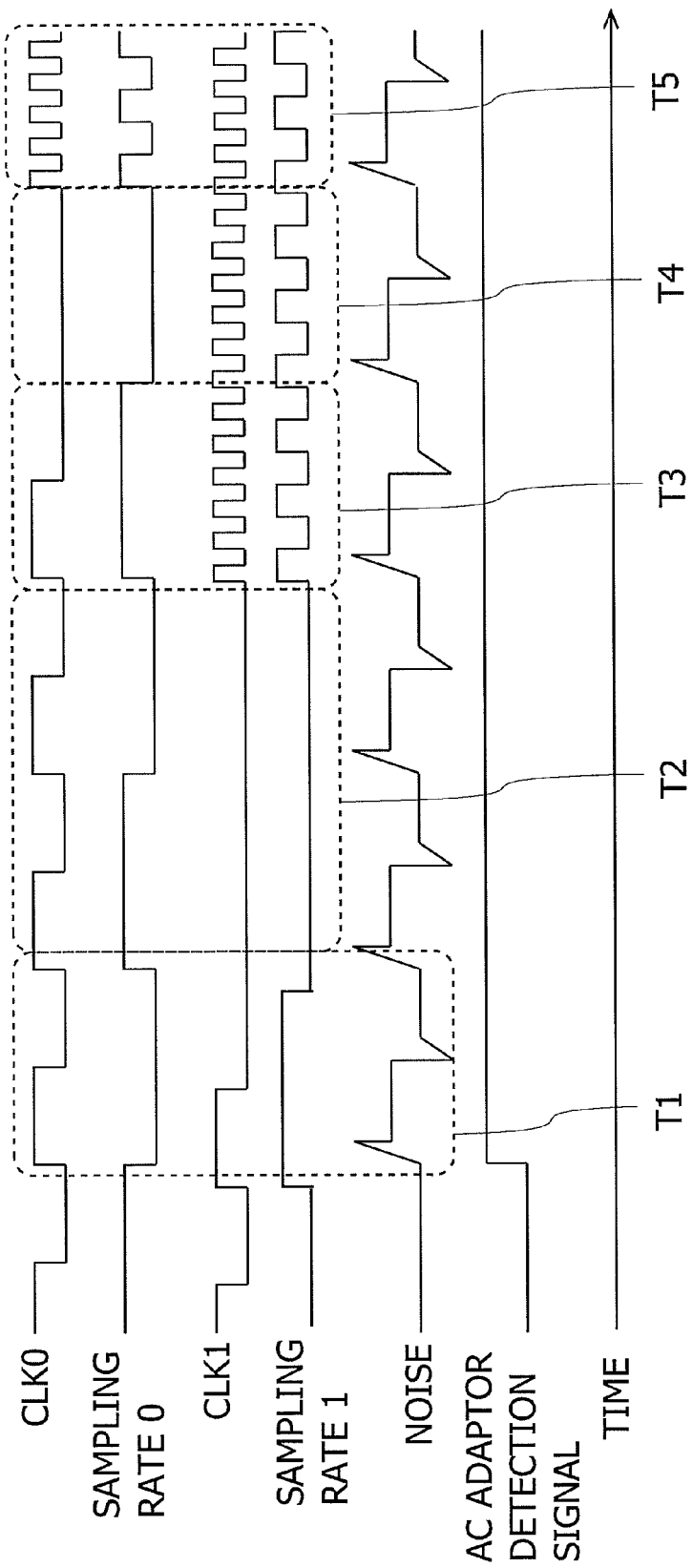
FIG. 9 is a timing chart of a process of changing the frequency of the clock signal input to the CPU.

FIG. 9 is a timing chart of the process of changing the frequency of the clock signal input to the CPU 51a. A symbol CLK0 indicates a waveform of the clock signal input to the CPU0 51a by the CLK0 53a. A sampling rate 0 indicates a waveform of the sampling rate of the scan lines 71a, controlled by the CPU0 51a, on the touch panel 70. A symbol CLK1 indicates a waveform of the clock signal input to the CPU1 51b by the CLK1 53b. A sampling rate 1 indicates a waveform of the sampling rate of the scan lines 71b, controlled by the CPU1 51b, on the touch panel 70. Noise indicates a waveform of the noises received from the AC adaptor 200. An AC adaptor detection signal indicates a waveform of the AC adaptor detection signal 202 used for the AC adaptor detection circuit 201 to notify of the connection of the AC adaptor 200. A symbol TIME indicates an advancement of time toward right from left in FIG. 9.

The frequency of the CLK0 is the same as the frequency of the CLK1 at T1. Further, the CLK0 and the CLK1 are different in phase from each other at T1. In FIG. 9, the sampling rates 0 and 1 are ½-fold of the frequencies of the CLK0 and the CLK1. The frequency of the noises is the same as the frequency of each of the CLK0 and the CLK1 just when connecting the AC adaptor 200. A process of switching over the frequencies of the CLK0 and the CLK1 will hereinafter be described with reference to FIG. 9.

The AC adaptor 200 is connected to the notebook computer 501 at T1. The AC adaptor detection circuit 201 detects the connection of the AC adaptor 200. The AC adaptor detection circuit 201 outputs a signal for notifying of the connection of the AC adaptor 200. The noises generated from the AC adaptor 200 have the same frequency as the frequency of each of the CLK0 and the CLK1.

The CPU0 51a stops the CLK1 at T2. However, the CLK0 is input, and hence the CPU0 51a continues operating. The scan lines 71a are thereby enabled to detect the user's touch operation on the touch panel 70 even when stopping the CLK1.

Upon an input of the CLK1 with its frequency being changed, the CPU1 51b starts operating at T3. The frequency of the CLK1 is different from the frequency of the noises. Hence, the degree of the CPU1 51b being affected by the noises is reduced.

The CPU1 51b stops the CLK0 at T4. However, the CLK1 is input, and consequently the CPU1 51b continues operating. The scan lines 71b are thereby enabled to detect the user's touch operation on the touch panel 70 even when stopping the CLK0.

Upon an input of the CLK0 with its frequency being changed, the CPU0 51a starts operating at T5. The frequency of each of the CLK0 and the CLK1 is different from the frequency of the noises from T5 onward. The degree of the CPU 51 being affected by the noises is reduced from T5 onward.

In the embodiment, the AC adaptor 200 changes the frequency of the clock signal input to the CPU 51 when the AC adaptor 200 is connected to the notebook computer 501. As a result, there is reduced the degree of the CPU 51 being affected by the noises originating from the AC adaptor 200.

In the embodiment, when the AC adaptor 200 is connected, the notebook computer 501 increases the frequency of the clock signal of the CPU 51. As a consequence, there is reduced the degree of the CPU 51 being affected by the noises originating from the AC adaptor 200.

In the embodiment, when the AC adaptor 200 is connected, the notebook computer 501 increases the frequency of the clock signal of the CPU 51. Whereas when the AC adaptor 200 is disconnected, the notebook computer 501 decreases the frequency of the clock signal of the CPU 51. In other words, an augmentation period of power consumption of the CPU 51 corresponds to a connection period of the AC adaptor 200. The embodiment therefore enables a reduction in influence on the operation time, based on the battery 512, of the notebook computer 501.

In the embodiment, there are alternately changed the frequencies of the clock signals input to the two CPUs, i.e., the CPU0 51a and the CPU1 51b. As a result, the touch panel 70 can detect the user's operation even in the process of changing the frequency of the clock signal input to the CPU Si.

<First Modified Example>

Figure 10:
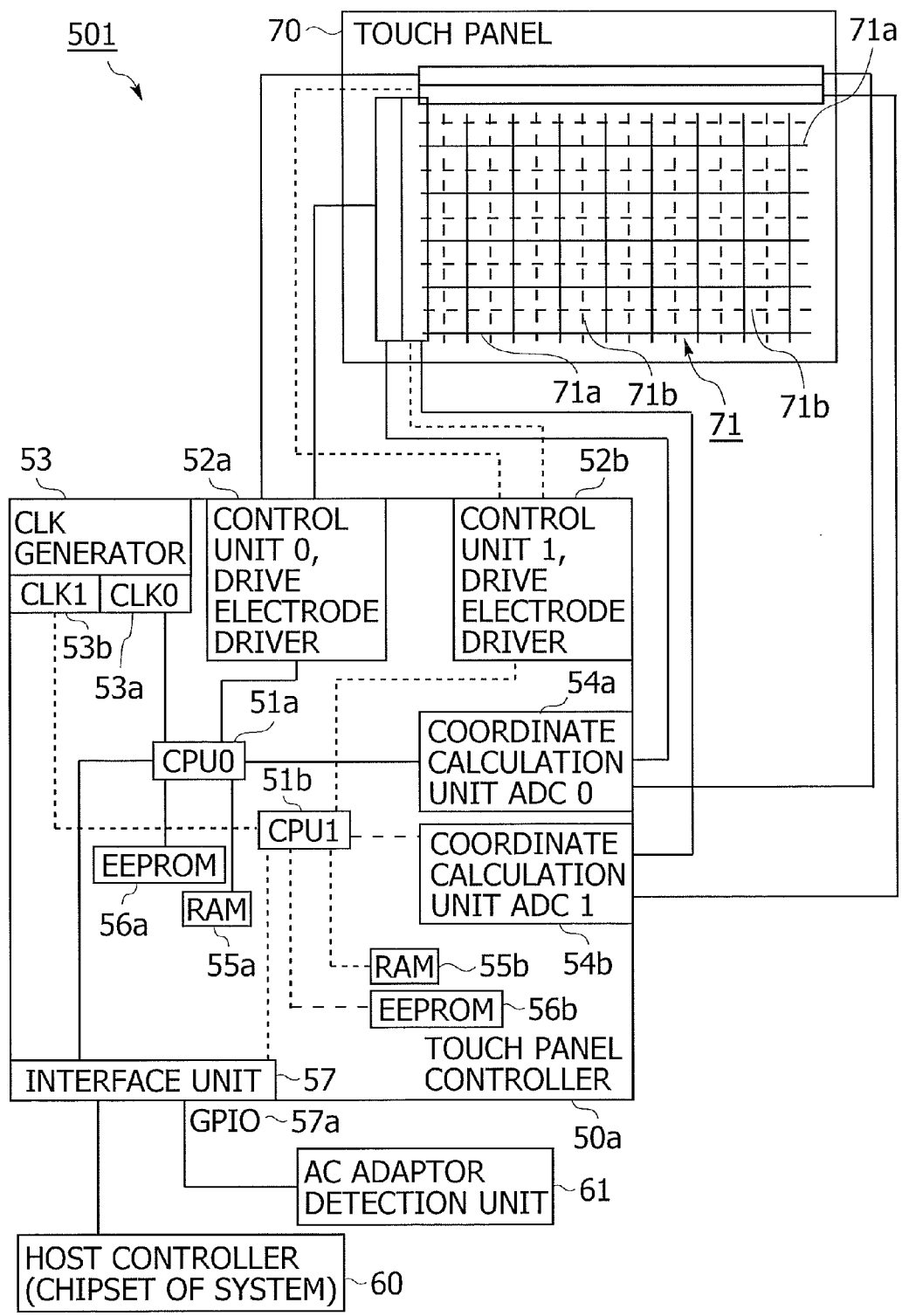
FIG. 10 is a diagram illustrating a configuration of a first modified example.

FIG. 10 is a diagram illustrating a configuration of a first modified example. In the embodiment, the touch panel controller 50 calculates the coordinate. The first modified example will discuss a case in which the HOST controller 60 calculates the coordinate. Note that the same components as those in the embodiment are marked with the same numerals and symbols, and their explanations are omitted.

A touch panel controller 50a in the first modified example does not include the arithmetic unit 58, unlike the touch panel controller 50 in the embodiment. The signals received by a coordinate calculation unit ADC0 54a and a coordinate calculation unit ADC1 54b from the touch panel 70 are transmitted to the HOST controller 60 via the interface unit 57.

The HOST controller 60 accepts the signal from the touch panel controller 50a. The HOST controller 60 calculates, based on the signal input from the touch panel controller 50a, a coordinate of the position input to the touch panel 70.

The HOST controller 60 calculates the coordinate on the touch panel 70 in the first modified example. In the first modified example, a calculation load on the touch panel controller 50a is therefore reduced.

<Second Modified Example>

Figure 11:
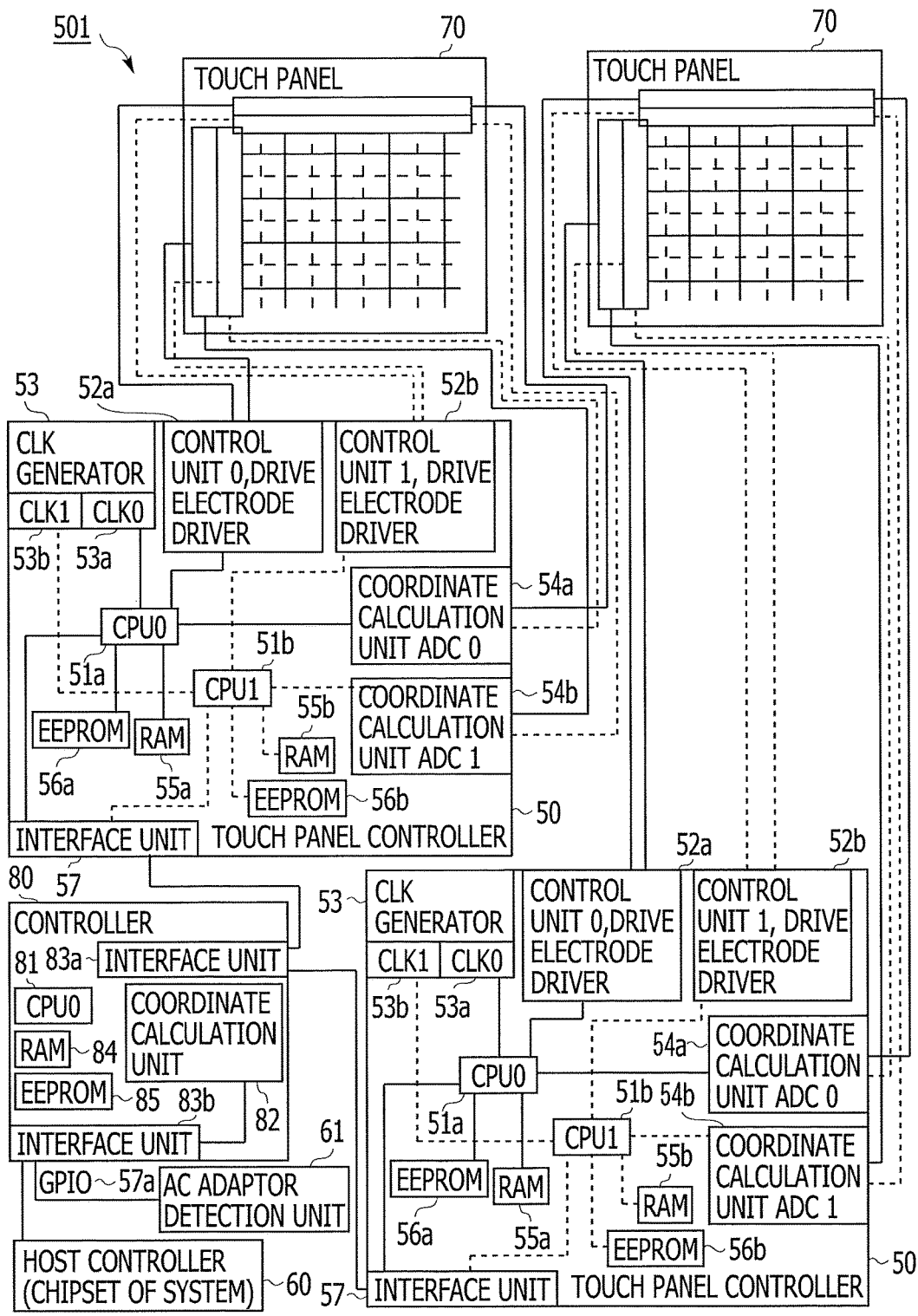
FIG. 11 is a diagram illustrating a configuration of a second modified example.

FIG. 11 is a diagram illustrating a configuration of a second modified example. The single touch panel controller 50 controls the single touch panel 70 in the embodiment. The capacitance type touch panel is, however, restricted in terms of a space of the touch panel. Such being the case, the second modified example will discuss a configuration enabling a user to be provided with a wider touch panel environment than in the embodiment by using a plurality of touch panel controllers 50 that control a plurality of touch panels 70.

FIG. 11 depicts the two touch panels 70, the two touch panel controllers 50 to control the respective touch panels 70, a controller 80, the AC adaptor detection unit 61 and the HOST controller 60. The second modified example will hereinafter be described with reference to FIG. 11. Note that the same components as those in the embodiment are marked with the same numerals and symbols, and their explanations are omitted.

The controller 80 accepts the signals from the two touch panel controllers 50. The controller 80 calculates a coordinate in a way that merges the signals input from the two touch panel controllers 50. The controller 80 includes a CPU0 81, a coordinate calculation unit 82, an interface unit 83a, an interface unit 83b, a RAM 84 and an EEPROM 85.

The CPU0 81 is an arithmetic processing unit provided in the controller 80. The RAM 84 is the volatile memory. The RAM 84 provides an operation area to the CPU0 81. The EEPROM 85 is the nonvolatile memory. The EEPROM 85 stores the setting information and other equivalent information. The interface unit 83a receives coordinate data input to the touch panels from the two touch panel controllers 50. The coordinate calculation unit 82 calculates the coordinate data, based on the data input to the interface unit 83a. The interface unit 83b transmits a result of the calculation made by the coordinate calculation unit 82 to the HOST controller 60.

In the second modified example, the two touch panel controllers 50 control the two touch panels 70. The controller 80 calculates the signals given from the two touch panels 70, and outputs the coordinate data. As a result, the second modified example enables the user to be provided with the wider operation environment using the touch panels than in the embodiment.

Note that the second modified example uses the two touch panels 70. The number of the touch panels 70 is not, however, limited to "2". In the second modified example, the number of the touch panels 70 may be set to "3" or more by providing the touch panel controllers 50 corresponding to the respective touch panels 70.

<Third Modified Example>

Figure 12:
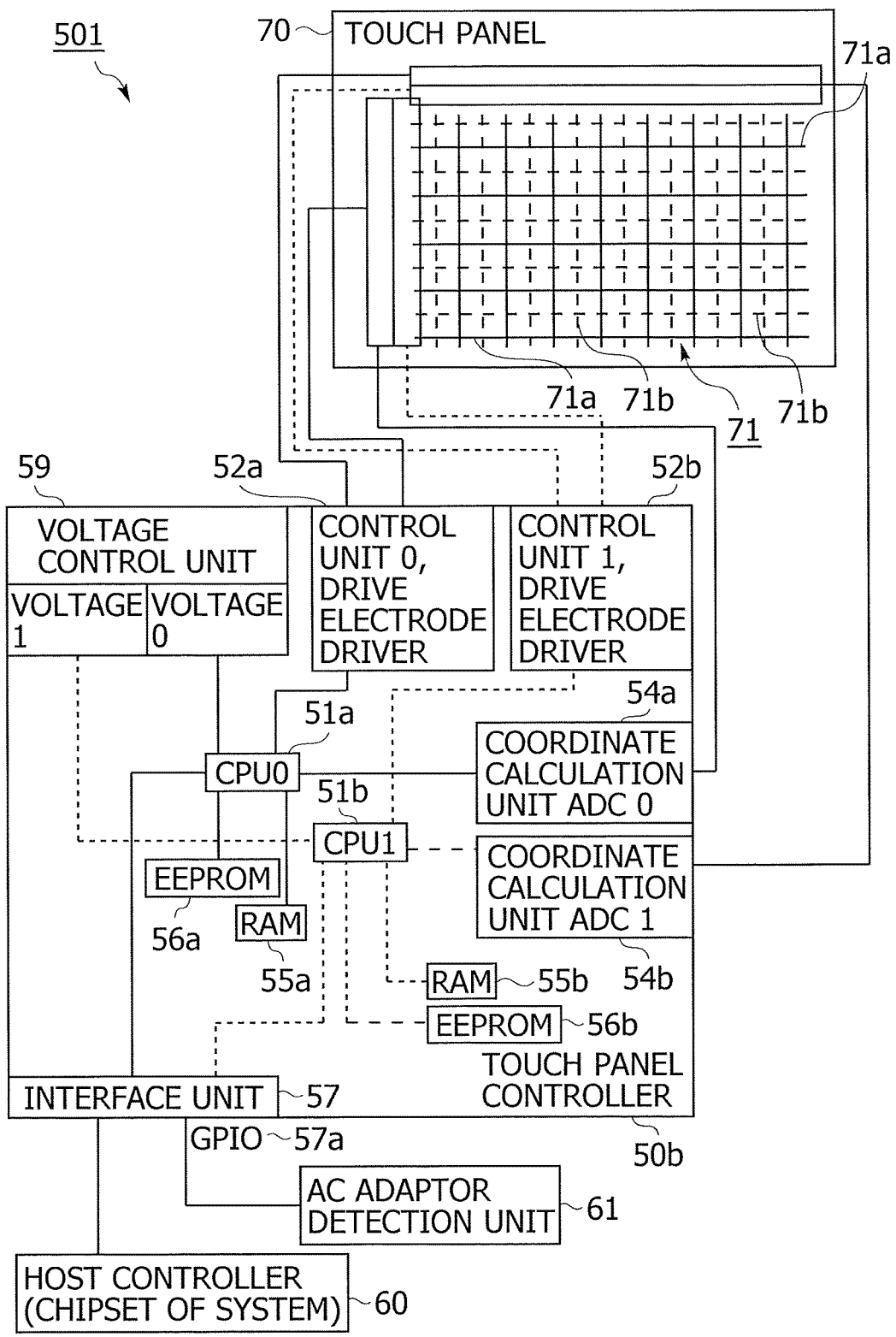
FIG. 12 is a diagram illustrating a configuration of a third modified example.

FIG. 12 is a diagram illustrating a configuration of a third modified example. In the embodiment, the degree of being affected by the noises is reduced by changing the frequency of the clock signal input to the CPU 51. The third modified example reduced the degree of being affected by the noises by changing a drive voltage input to the CPU 51. The drive voltage is one example of a "physical property of the drive signal". Note that the same components as those in the embodiment are marked with the same numerals and symbols, and their explanations are omitted.

FIG. 12 depicts a touch panel controller 50b, the HOST controller 60 and the touch panel 70. The touch panel controller 50b is substantially the same as the touch panel controller 50 in the embodiment except that the CLK generator 53 is provided in place of a voltage control unit 59.

The voltage control unit 59 controls the drive voltage input to the CPU 51. When the AC adaptor detection unit 61 detects the connection of the AC adaptor 200, the voltage control unit 59 changes the drive voltage input to the CPU 51. The voltage control unit 59, e.g., may simply set the drive voltage input to the CPU 51 higher than normal within a rated range. A Signal-to-Noise (SN) ratio of the clock signal input to the CPU 51 is improved by setting the drive voltage input to the CPU 51 higher than normal. When the AC adaptor detection unit 61 detects the disconnection of the AC adaptor 200, the voltage control unit 59 sets the drive voltage input to the CPU 51 back to the normal voltage.

Figure 13:
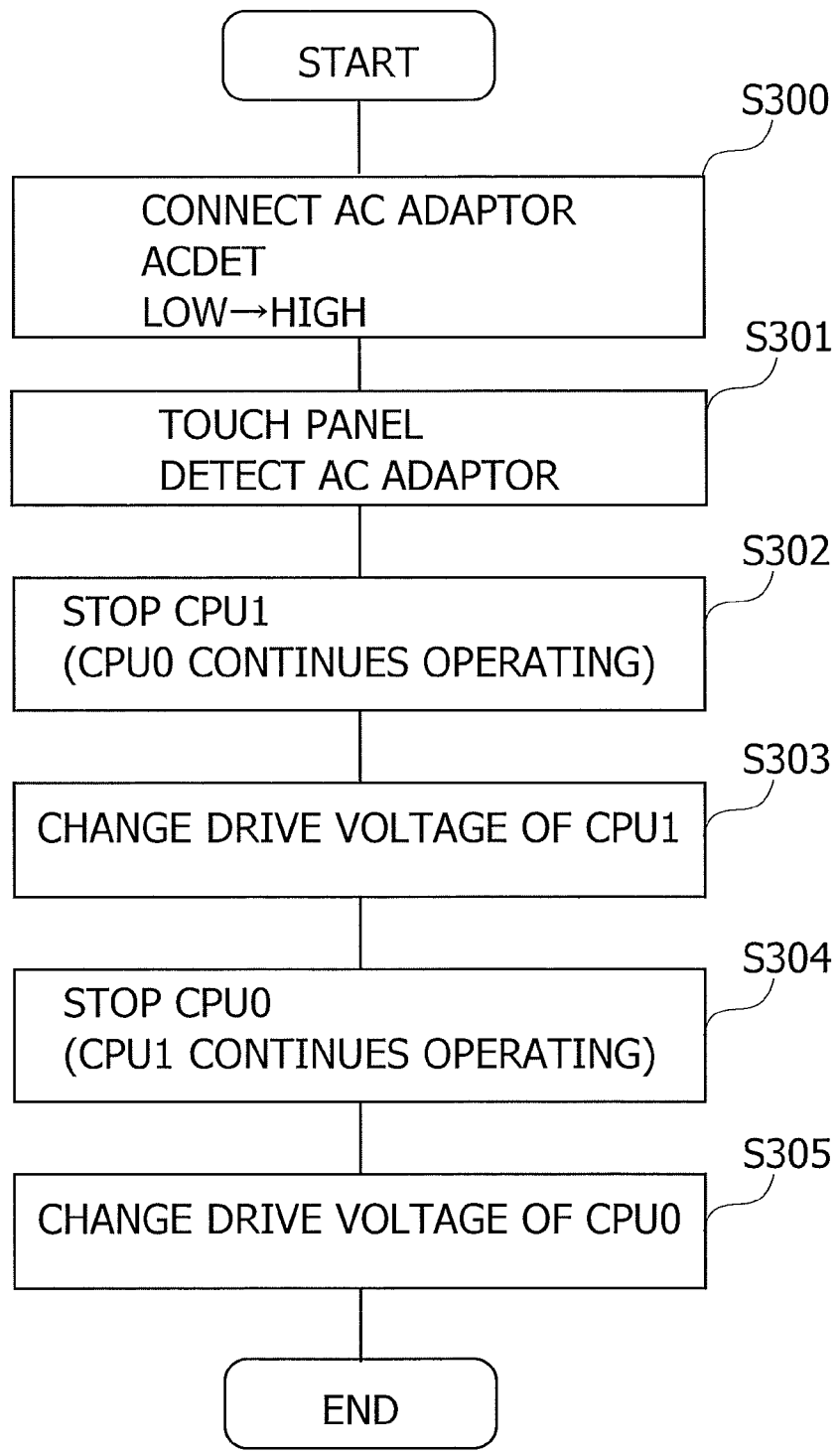
FIG. 13 is a flowchart illustrating a processing flow when the AC adaptor is connected in the third modified example.

FIG. 13 is a flowchart illustrating a processing flow when the AC adaptor 200 is connected in the third modified example. Processes in respective steps of FIG. 13 are substantially the same as the processes in the respective steps of FIG. 7A except a point of changing the drive voltage in FIG. 13 in place of changing the frequency of the clock signal in FIG. 7A. Accordingly, their redundant explanations are omitted.

Figure 14:
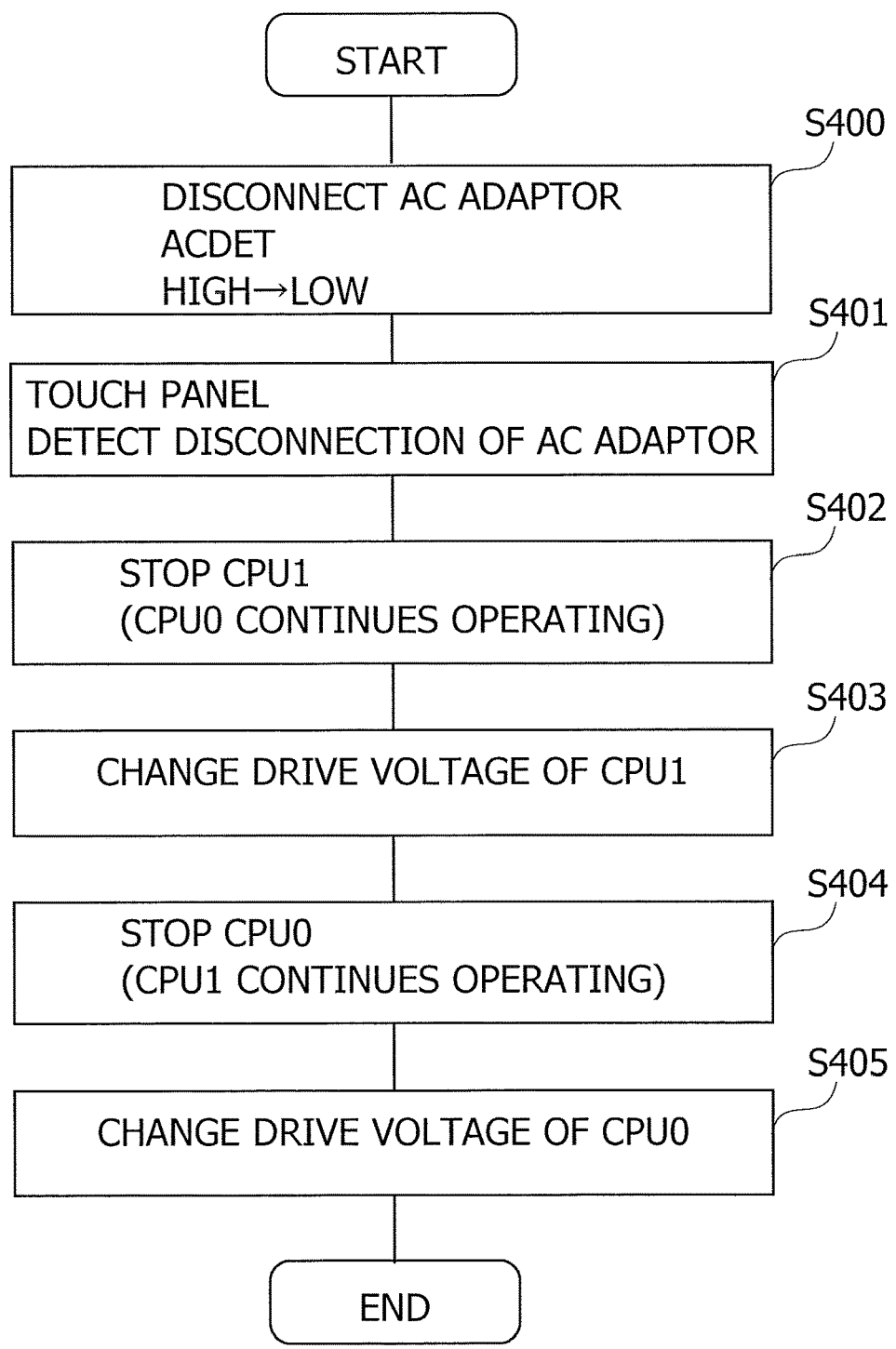
FIG. 14 is a flowchart illustrating a processing flow when the AC adaptor is disconnected in the third modified example.

FIG. 14 is a flowchart illustrating a processing flow when disconnecting the AC adaptor 200 in the third modified example. Processes in FIG. 14 are substantially the same as the processes in FIG. 13 except that the disconnection of the AC adaptor 200 is detected in S400, S401 and that the drive voltage input to the CPU 51 is decreased in S403, S405. Their redundant explanations are therefore omitted.

In the third modified example, when the AC adaptor 200 is connected, the drive voltage input to the CPU 51 is changed. As a result, there is reduced the degree of the CPU 51 being affected by the noises originating from the AC adaptor 200.

In the third modified example, the drive voltage input to the CPU 51 is increased during the connection of the AC adaptor 200. As a consequence, there is reduced the degree of the CPU 51 being affected by the noises originating from the AC adaptor 200.

In the third modified example, the drive voltage input to the CPU 51 is increased during the connection of the AC adaptor 200. When the AC adaptor 200 is disconnected, the drive voltage input to the CPU 51 is set back to the normal voltage. In other words, the increasing period of the power consumption of the CPU 51 is the connecting period of the AC adaptor 200. Resultantly, the third modified example enables the reduction in influence on the operation time, based on the battery 512, of the notebook computer 501.

The present information processing apparatus reduces the malfunction of the touch panel due to the noises generated from the power source.

The embodiment and the modified examples disclosed above can be respectively combined. For example, the embodiment is combined with the third modified example, in which upon detecting the connection of the AC adaptor 200, the drive voltage and the frequency of the clock signal each input to the CPU 51 may be changed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus, comprising:
    a memory;
    an internal power source;
    a touch panel including first scan lines and second scan lines;
    a first processor communicatively coupled to the memory and configured to control the first scan lines;
    a second processer communicatively coupled to the memory and configured to control the second scan lines; and
    a detection circuit configured to detect a switchover between power sources of the information processing apparatus, the power sources including the internal power source and an external power source, wherein
    in response to the detection circuit detecting connection of the external power source:
        the first processor directing stoppage of second drive signals being input to the second scan lines and directing change of a physical property of the second drive signals to be input to the second scan lines, and the second processor directing input of the second drive signals with the changed physical property to the second scan lines, and
        the second processor directing stoppage of first drive signals being input to the first scan lines and directing change of a physical property of the first drive signals to be input to the first scan lines, and the first processor directing input of the first drive signals with the changed physical property to the first scan lines.

2. The information processing apparatus according to claim 1, wherein the physical property includes a frequency of a clock signal to be input to the first processor.

3. The information processing apparatus according to claim 1, wherein the physical property includes a drive voltage to be input to the first processor.

4. The information processing apparatus according to claim 1, wherein the second processor is further configured to perform operations comprising:
    receiving information indicating an input position to the touch panel; and
    calculating, based on the information received, coordinate data of the input position to the touch panel.

* * * * *